Dec. 3, 1963    M. RIGERT    3,113,246
REPEATING CIRCUIT INTERRUPTERS
Filed Feb. 16, 1960    3 Sheets-Sheet 1

INVENTOR.
Max Rigert
BY Fred Wiviott
Attorney

INVENTOR.
Max Rigert
BY Fred Wiviott
Attorney

United States Patent Office 3,113,246
Patented Dec. 3, 1963

3,113,246
REPEATING CIRCUIT INTERRUPTERS
Max Rigert, West Allis, Wis., assignor to McGraw-Edison Company, Milwaukee, Wis., a corporation of Delaware
Filed Feb. 16, 1960, Ser. No. 9,012
6 Claims. (Cl. 317—22)

This invention relates to improvements in repeating circuit interrupters of the type commonly known as reclosers.

Reclosers are generally installed in electrical distribution systems adjacent the source of power or at the origin of a branch line which in turn supplies other subsidiary lines. In the event that a fault occurs on the load side of it, the recloser is usually adjusted to execute a sequence of opening operations, usually four, and somewhat delayed reclosing operations, during which time most faults will clear.

If the fault clears during any of these successive operations, the recloser closes and maintians power in the line. If the fault does not clear during the total sequence of opening and reclosing operations, however, the fault is considered permanent and the recloser automatically locks open to disconnect the branch line being protected from its source. In order to properly coordinate a particular recloser with other reclosers and fuses in the system, it is imperative that the recloser have a predictable time-current characteristic throughout its entire expected fault current range.

One type of prior art recloser utilizes a solenoid or relay having a coil in series with the line for sensing fault current and an armature operative to open its main contacts. This type of recloser is generally utilized only in radial type systems, however, where the line being protected is fed from a single source. Here, the reclosers are adjusted so that their opening time decreases in accordance with their relative remoteness from the power source so that the fault will be isolated by the first recloser on the source side of the fault. In loop circuits, however, wherein the line being protected is fed from a plurality of sources, this type of recloser is not wholly satisfactory because the series connected fault sensing coil cannot distinguish the direction of a fault current. Also, in loop circuits, where a plurality of power sources are employed, a recloser may be relatively close to one source of power and at the same time relatively far from another, so that it is extremely difficult to isolate faults with conventional devices. It is, therefore, important that reclosers used in loop circuits be able to distinguish fault current directions. It will be understood that in an alternating system, the phrase fault current direction refers to its direction during the positive half cycle.

It is an object of the invention to provide a repeating circuit interrupter having a series connected current sensing coil, with operation modifying means responsive to fault current flowing in a given direction.

Another object of the invention is to provide a repeating circuit interrupter with directional current responsive means which is operative to modify the operation thereof when fault current flows in a first direction and which is ineffective when fault current flows in an opposite direction. This modification may either take the form of changing the recloser's time delay for fault currents flowing in said first direction or of blocking its opening mechanism so that its contacts will not open upon the occurrence of such fault currents.

A more specific object of the inventon is to provide a recloser having dual time delay means with means for switching from one to the other when fault current flows in a reverse direction.

Another specific object of the invention is to provide a repeating circuit interrupter having a series connected over-current coil, a coacting magnetic plunger, and blocking means for preventing the opening of said circuit interrupter but which does not interfere with the movement of said magnetic plunger.

Still another object of the invention is to provide a loop circuit having a plurality of reclosers whose time delays are so arranged that faults will be isolated without the interruption of service to the remainder of the system.

A further specific object of the invention is to provide a recloser in which the discharge of hydraulic fluid through relief port means determines the device's time delay, and means for modifying said discharge when fault current flow is in a reverse direction.

Another object of the invention is to provide a recloser having a magnetic operator for opening the main contacts with resilient coupling means so that the main contacts can be blocked without restraining the movement of said magnetic operator under the influence of a fault current.

These and other objects and advantages of the invention will become more apparent from the detailed description of the invention taken with the accompanying drawings in which:

FIG. 1 schematically illustrates one embodiment of the instant invention;

Figure 1:
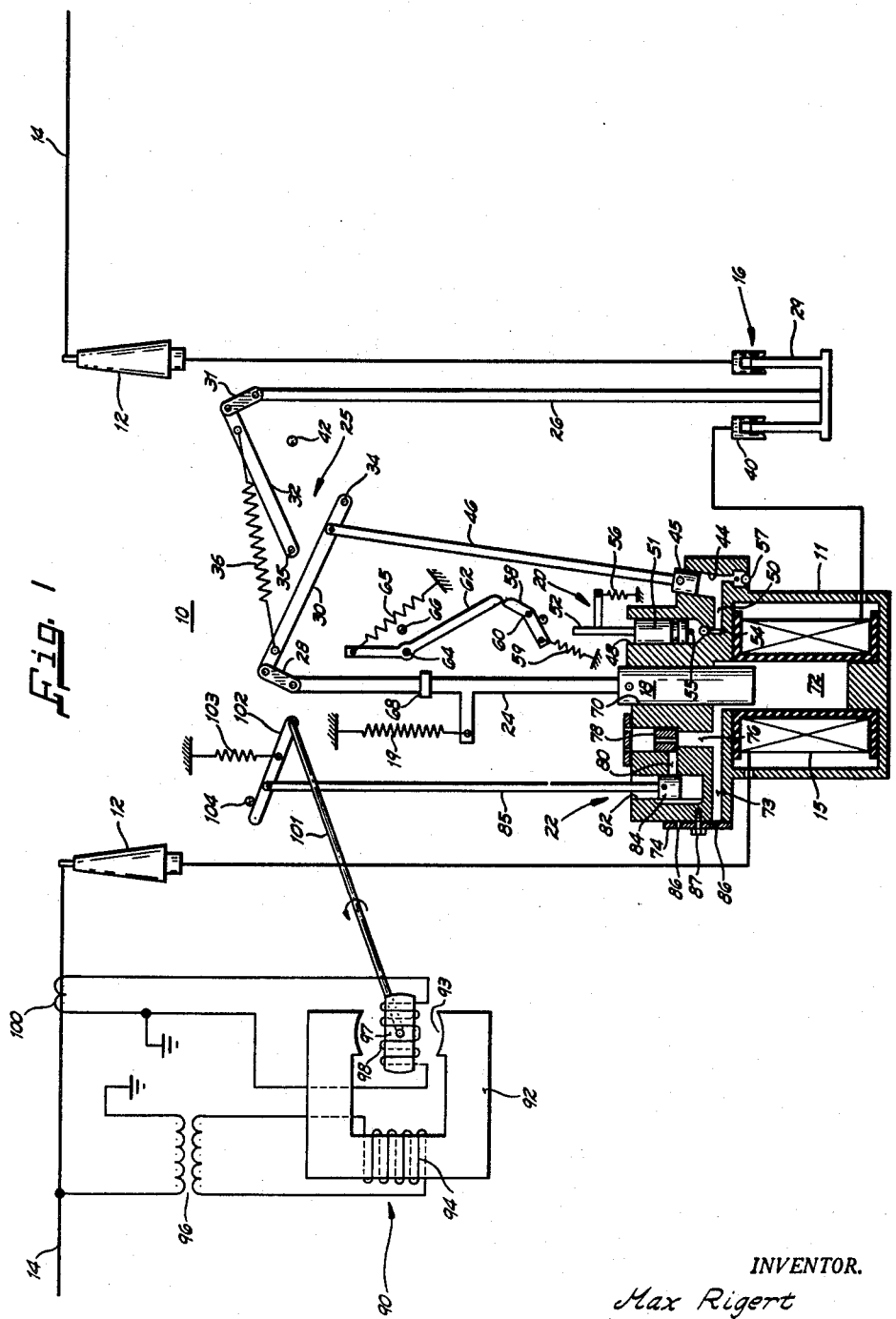

Referring to the drawings in greater detail, FIG. 1 shows a repeating, oil-immersed circuit interrupter or recloser, designated generally by the reference numeral 10, having a body portion 11 for housing hydraulic operating components and a pair of terminals 12 in circuit with the line 14 being protected. In series between terminals 12 is an over-current sensing coil 15 and the circuit breaker's main contacts 16. The circuit breaker 10 also includes opening means, which comprises coil 15 and magnetic plunger 18 and reclosing means 19 which are each operatively connected to the main contacts 16 and to operation counting and lockout means 20. The latter is operable after a predetermined number of opening operations to prevent further reclosing of the circuit breaker contacts 16. Time delay means 22, which is operatively associated with magnetic plunger 18, determines the time that will elapse after fault current is sensed before contacts 16 are opened. A circuit breaker of the type just described and which illustrates similar components in greater detail, is shown and discussed in Patent No. 2,734,961 to W. R. Harry, issued on February 14, 1956, and assigned to the assignee of the instant invention.

Magnetic plunger 18 is reciprocably mounted in body portion 11 and is connected to the main contacts 16 by means of a first long link 24, a toggle linkage 25 and a second long link 26. The lower end of first long link 24 is connected to magnetic plunger 18 while its upper end is connected through a coupling link 28 to the free end of a first toggle link 30. Similarly, the lower end of the second long link 26 is rigidly connected to the movable portion 29 of main contacts 16 while its upper end is connected through connecting link 31 to the free end of a second toggle link 32. The other end of each of the toggle links 30 and 32 is pivotally mounted about spaced apart fixed axes 34 and 35 respectively.

From the structure thus far described it can be seen that each time series coil 15 is traversed by a fault current, magnetic plunger 18 will be attracted downwardly thereby pivoting the free end of toggle link 30 in a counterclockwise direction about its fixed pivotal axis 34. As toggle link 30 rotates, the left end of over-center spring 36 is moved downwardly until its line of action passes the fixed pivotal axis 35 of link 32 whereupon the toggle linkage 25 becomes overcentered and link 32 is snapped in a clockwise direction to disengage movable contacts 29 from stationary contacts 40 whereupon the circuit is interrupted. Clockwise rotation of link 32 is limited by a stop 42.

The opening of contacts 16 de-energizes series coil 15 so that magnetic plunger 18 is free to be drawn upwardly under the influence of the reclosing spring 19 connected to long link 24. This upward movement of magnetic plunger 18 rotates toggle link 30 in a clockwise direction toward its initial position shown in FIG. 1. As toggle link 30 rotates the line of action of overcenter spring 36 will again pass pivot 35 whereupon linkage 25 will again be overcentered and toggle link 32 will snap upwardly in a counterclockwise direction to reclose contacts 16.

The operation, counting and lockout means 20 includes a lockout pump cylinder 44 formed in body portion 11 and a pump piston 45 connected by a link 46 to toggle link 30. Pump cylinder 44 communicates with a counting cylinder 48, which is also formed in body portion 11, through a passage 50. A counting piston 51 is disposed in counting cylinder 48 and carries a lockout stem 52 at its upper end. It can be seen that each time magnetic plunger 18 is drawn downwardly under the influence of a fault current, the counterclockwise rotation of toggle link 30 will force pumping piston 45 downwardly into its cylinder 44 so that a predetermined volume of dielectric fluid is forced past valve 54 and into cylinder 48 below counting piston 51. This forces counting piston 51 upwardly away from a stop 55 and against the influence of a resetting spring 56. When the contacts 16 are reclosed, the clockwise rotation of link 30 moves pump piston 45 upwardly thereby drawing a fresh quantity of fluid into cylinder 44 through valve 57. If the fault has not cleared after a predetermined number of opening and reclosing operations, the cumulative upward movement of piston 51 will cause lockout stem 52 to engage a lock out latch 58 and to rotate it about its pivotal axis 60 against the influence of a spring 59. This releases a lockout bar 62 for rotation in a clockwise direction around pivotal axis 64 and under the influence of a spring 65 until it engages a fixed stop 66. The latter operation will occur while magnetic plunger 18 is in its downward or attracted position so that the lower end of lockout bar 62 will engage a lockout latch 68 carried by long link 24 thereby holding said link in its downward position to prevent the reclosure of contacts 16. Means, not shown, but that are well known in the art, are provided for manually resetting the device after such an automatic lockout operation.

It can be seen that magnetic plunger 18 is slidably received in a bore 70 formed in body portion 11 for movement into a dash pot cylinder 72 formed coaxially within coil 15. Dash pot cylinder 72, which is closed at its lower end, is connected by a duct 73 to a slide valve passage 76 and an orifice plate 74. When the magnetic plunger 18 is drawn downwardly into dash pot cylinder 72 under the influence of an over-current in coil 15, the hydraulic pressure thus created forces a slide valve body 78 upward in passage 76 to open the inner end of a second duct 80 which connects passage 76 to a second slide valve passage 82 whose upper end is vented to the ambient fluid. The dielectric fluid expelled from dash pot cylinder 72 is, however, normally prevented from discharging through duct 80 and passage 82 by a second slide valve 84 disposed in passage 82 and normally held adjacent the outer end of duct 80 by a link 85. Hence, under normal conditions of recloser operation dash pot cylinder 72 is vented solely through one of the orifices 86 in plate 74.

It can be seen from the foregoing discussion that when slide valve 84 blocks duct 80, a back pressure is built up in duct 73 each time magnetic plunger 18 descends into dash pot cylinder 72. As a result, under this condition of operation, the descent of magnetic plunger 18 will be retarded thereby effecting retarded switch opening operation. As explained more fully in the aforementioned patent, orifice plate 74 has a plurality of various sized orifices 86 disposed equiradially around a bolt 87 which attaches it to body portion 11. As a result, the time delay of the circuit interrupter 10 can be adjusted by rotating valve plate 74 around bolt 87 until a predetermined one of orifices 86 is adjacent duct 73.

The means for modifying the operation of the recloser upon the occurrence of a reverse current, is indicated generally by the reference numeral 90 and includes a horseshoe shaped magnetic core 92 having an air gap 93 and an exciting coil 94 which is coupled to the line 14 by means of a potential transformer 96. As a result, the excitation in air gap 93 will be a function of the voltage in line 14. A rotar 97 is rotatably mounted in air gap 93 and has a pair of serially connected, differentially wound coils 98 and 98' which are connected to the line 14 by means of a current transformer 100. Thus, the current in coils 98 and 98' are governed by the current direction in line 14.

The flux in air gap 93 resulting from the current in coil 94 will, on the other hand, not be affected by the direction of power flow in the system, because the voltage across the primary of potential transformer 96 will always be from line to ground. As a result, the direction of the torque acting on rotor 97 will be controlled by the direction of the fault current flowing in line 14.

A shaft 101 mechanically connects rotor 97 to one end of a link 101 that is also connected to the upper end of vertical link 85. When rotor 97 rotates in a counterclockwise direction the consequent rotation of link 102 forces link 85 and slide valve 84 downwardly in opposition to resetting spring 103. This opens the outer end of duct 80 thereby connecting it to the exterior of body portion 11 so that the hydraulic fluid expelled from dash pot cylinder 72 when magnetic plunger 18 descends, is able to vent through said duct as well as orifice 86.

Thus, when the fault current is in a first direction, rotor 97 will be rotated in a counterclockwise direction to open lateral duct 80 and thereby change the time delay of recloser 10. When the fault current is in the opposite direction, however, rotor 97 is prevented from rotating in a clockwise direction by a stop 104 that lies in the rotational path of link 102. Hence, it can be seen that recloser 10 will have a first time delay when the fault current is in a first direction wherein lateral duct 80 is open and a second, slower time delay, when the fault current is in an opposite direction and wherein said duct is closed. It will be appreciated that the direction of fault current necessary to modify the time delay of recloser 10 by opening duct 80 can be reversed by reversing the connections between rotor 97 and current transformer 100.

Resetting spring 103 performs the additional function of opposing the torque on rotor 97 so that it will not begin rotating until the current in line 14 exceeds some minimum value.

Figure 2:
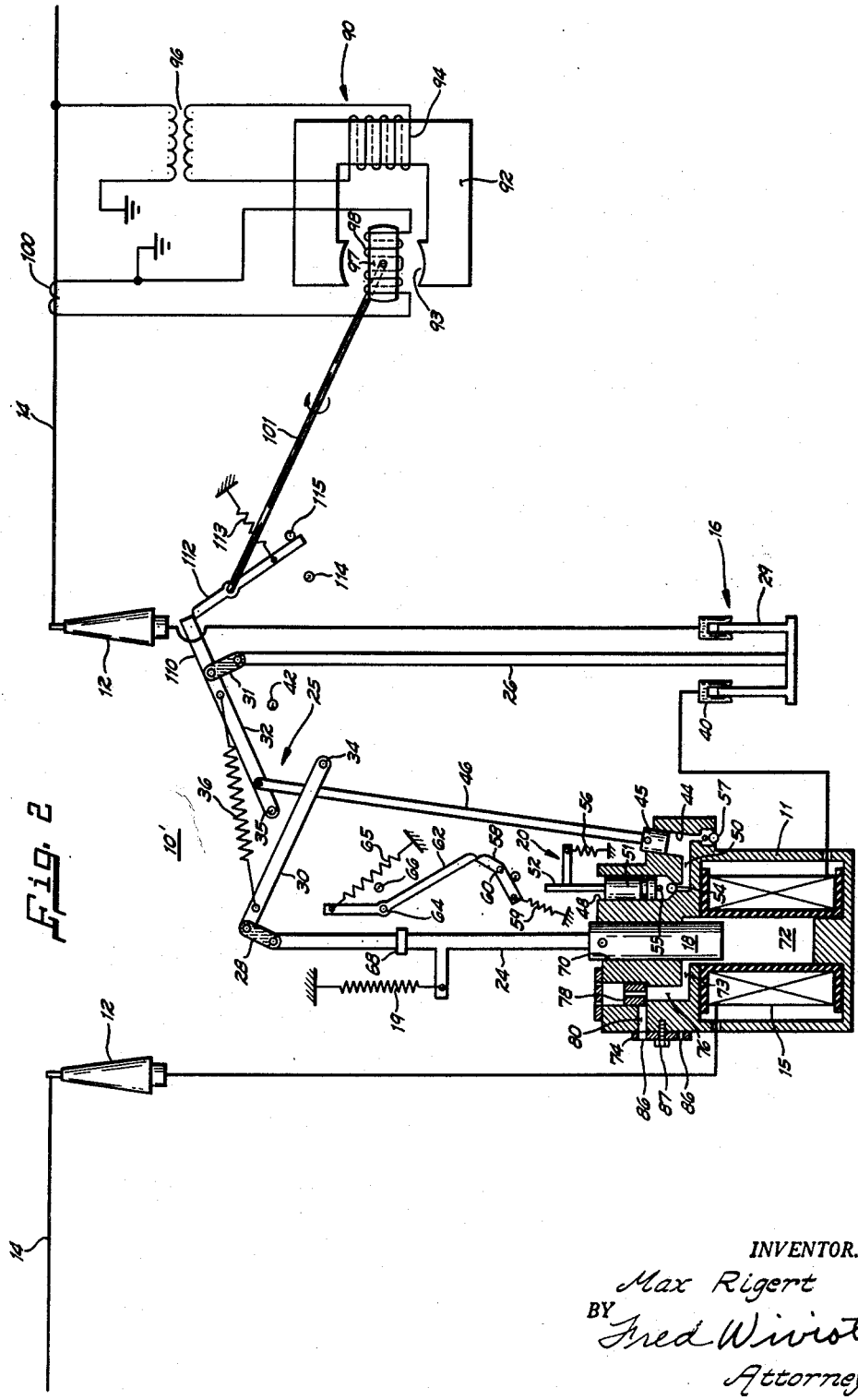
FIG. 2 illustrates an alternate embodiment of the instant invention.

In the alternate embodiment of the invention shown in FIG. 2, the current direction sensing means 90 is used to obtain unidirectional tripping of recloser 10. The operating components of the recloser are identical with those shown in FIG. 1 except that in the device of FIG. 2, duct 73 opens solely into slide valve passage 76 and duct 80 vents through one of the orifices 86 in orifice plate 74. It can be seen, therefore, that the time delay characteristic of this device is controlled by orifice plate 74.

The embodiment of FIG. 2 also differs from that discussed with respect to FIG. 1 in that an arm 110 is added to the end of toggle link 32 at its point of connection with link 31. Also, a latch link 112 is connected to shaft 101 and is normally in engagement with arm 110 so that toggle link 32 is normally prevented from rotating in a clockwise direction when magnetic plunger 18 descends under the influence of a fault current. However, when a fault current occurs in a predetermined direction, rotor 97 will rotate in a clockwise sense thereby rotating latch arm 112 in a clockwise direction against the influence of a spring 113 until it engages a stop 114. This releases arm 110 so that the circuit breaker 10 is free to open in the manner discussed with respect to FIG. 1. A second stop 115, which normally engages the upper surface of latch arm 112 near its lower end, as viewed in FIG. 2, prevents rotor 97 from rotating in a clockwise direction so that when a fault current occurs in an opposite direction in line 14, arm 110 remains latched and the circuit breaker is prevented from opening. It can be seen, however, that because links 24 and 26 are connected by the resilient overcenter toggle linkage 25, magnetic plunger 18 may still move downwardly under the influence of a fault current even though arm 110 is blocked. By allowing magnetic plunger 18 to descend in this manner when contacts 16 are blocked, the large magnetic forces between plunger 18 and coil 15 do not place inordinate stresses on the linkage as would occur if said magnetic plunger were restrained.

Figure 3:
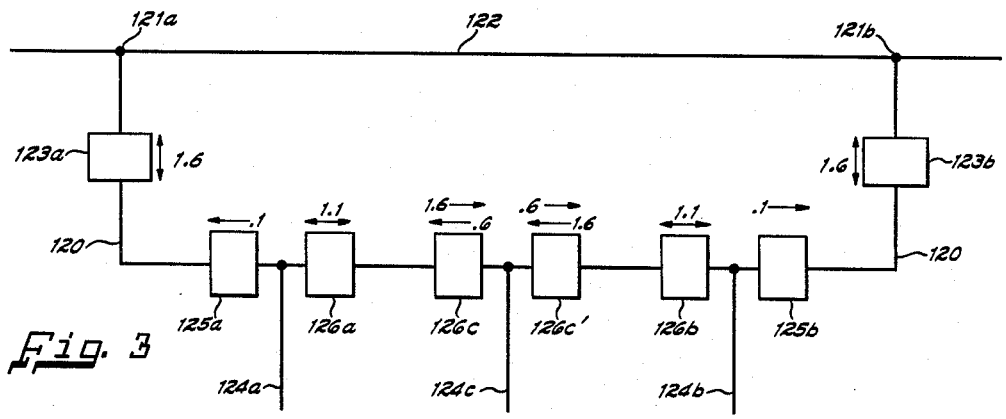
FIGS. 3, 4 and 5 show loop circuits in which reclosers according to the instant invention can be employed.

FIG. 3 shows a loop circuit in which the directionally oriented circuit breakers of FIGS. 1 and 2 are used. Here a loop circuit conductor 120 is shown connected at each end by taps 121a and 121b to a source of supply, symbolized in the drawing by a bus bar 122. The advantage of such a connection over a radial system, wherein the load conductor is connected to a source at only a single point, is that in a loop circuit, a fault occurring relatively close to the source of supply can be isolated, while the remainder of the circuit is supplied through the other end of the loop. In a radial system, on the other hand, if the circuit is interrupted at a point close to the source, service is discontinued through the remainder of the system.

The loop circuit illustrated in FIG. 3 includes conventional reclosers 123a and 123b connected in conductor 120 adjacent each of the taps 121a and 121b respectively. In addition, a plurality of radial load conductors 124a, 124b and 124c radiate from loop conductor 120. In circuit with conductor 120 and between each of the outer radial conductors 124a and 124b and the corresponding conventional reclosers 123a and 123b are unidirectional tripping reclosers 125a and 125b respectively, such as the one illustrated in FIG. 2. In circuit with loop conductor 120 and on the other side of each of the outer radial conductors 124a and 124c is a conventional recloser 126a and 126b respectively. Also disposed in loop conductor 120 and adjacent each side of its junction with the central radial conductor 124c is a dual-time delay recloser 126c and 126c' such as the one illustrated in FIG. 1 in which a different tripping time is provided for each direction of fault current.

The arrows and numerals adjacent each of the reclosers in FIG. 3, indicates the tripping time of each for a fault current flowing in the direction of the corresponding arrow. For example, each of the station reclosers 123a and 123b is arranged to open for a fault current flowing in either direction after a time delay of 1.6 seconds. Similarly, unidirectional reclosers 125a is adapted to trip after .1 second for a fault current flowing through it and to the left while recloser 125b is adapted to open after .1 second for a fault current flowing through it and to the right. In addition, each of the dual-time directional reclosers 126c and 126c' is designed to open after time delays of 1.6 seconds for fault currents flowing toward the center of loop conductor 120 and .6 second for fault currents flowing outwardly therefrom.

Assume for the sake of illustration, that a fault occurs in loop conductor 120 between reclosers 123a and 125a. It can be seen that fault current will flow from supply bus 122 through each of the taps 121a and 121b. As a result, recloser 123a will open after 1.6 seconds. In addition, due to the fault current flowing from tap 121b toward the left, recloser 125a will open after one tenth of a second. However, because each of the other reclosers between the fault and tap 121b has a longer time delay for currents flowing toward the left than does recloser 125a, they will remain closed. Thus, the fault will be isolated between reclosers 123a and 125a, conductors 124a, 124b and 124c being energized through tap 121b.

Should a fault occur in radial conductor 124a, fault current will again flow from each of the taps 121a and 121b to the fault. Likewise, recloser 123a will trip after 1.6 seconds, recloser 125a remaining closed, however, because it is unidirectional and hence does not trip for fault currents flowing through it to the right. In addition, recloser 126c will trip open after .6 second while each of the remaining reclosers between the fault and tap 121b remain closed. As a result, the fault in radial conductor 124a is isolated between reclosers 123a and 126c while service is continued in radial conductors 124b and 124c. It can be seen too, that because there are no radial conductors between reclosers 126a and 126c the former need not open when a fault current occurs in radial feeder 124a and hence is made unidirectional.

From the foregoing discussion it will be apparent reclosers 126a and 126c will isolate a fault existing in line 120 between them while a fault in radial conductor 124c will be isolated by reclosers 126a and 126b.

Figure 4:
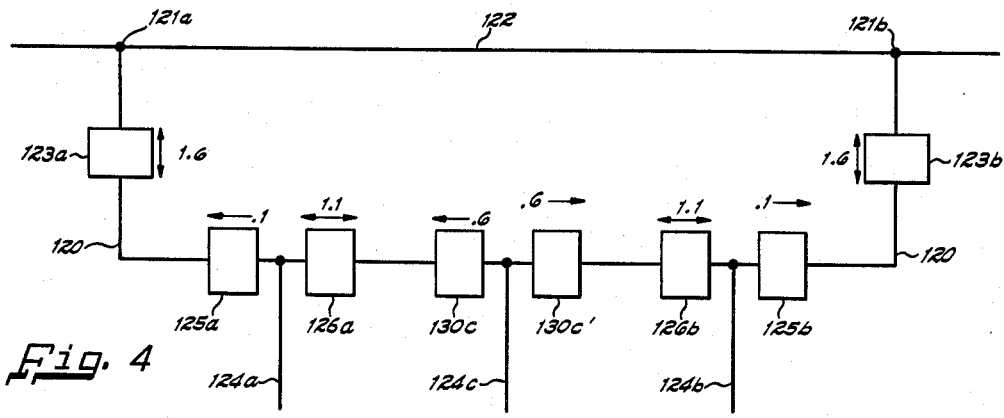
Figure 5:
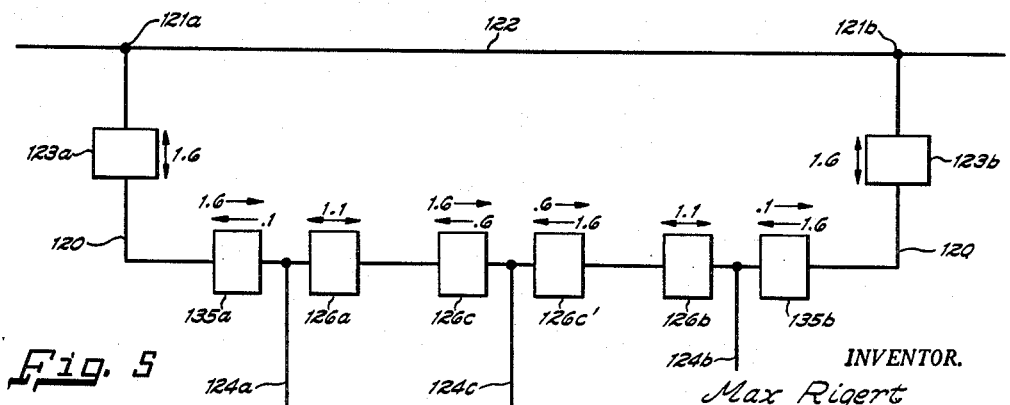

FIGS. 4 and 5 show modified forms of the loop circuit arrangement in which either the unidirectional or dual-time directional reclosers are used exclusively along with conventional reclosers. The circuit of FIG. 4 is identical to that shown in FIG. 3 except that here, unidirectional reclosers 130c and 130c' have replaced the dual-time delay reclosers 126c and 126c' of FIG. 3. It can be seen that if a fault occurs in radial conductor 124c of FIG. 4, it will be isolated by reclosers 126a and 126b while a fault in line 120 between radial conductor 124c and either of the radial conductors 124a and 124b will be isolated from conductor 124c by the appropriate one of reclosers 130c or 130c' so that service may continue to conductor 124c from the other side.

The system shown in FIG. 5 is also identical to that shown in FIG. 3 except that here dual-time delay reclosers 135a and 135b replace the unidirectional reclosers 125a and 125b of FIG. 1. It can be seen that reclosers 123a and 135a will isolate a fault occurring between them while reclosers 135a and 126c will operate to isolate a fault in feeder line 124a. A fault in loop conductor 120 between reclosers 126a and 126c or in radial conductor 124c will be isolated in the same manner as in the system of FIG. 3.

In each of the systems shown in FIGS. 3, 4 and 5 the time delays of the reclosers are so arranged that for an overload current flowing from one of the taps 121a or 121b, to any point in the system, a recloser will be located between said point and the adjacent feeder line on either side thereof which has a shorter time delay with respect to said fault current than any of the other reclosers between said point and said source. In this manner, a recloser on each side of the fault, and between the fault and the next adjacent feeder line will open to isolate the fault while the remaining reclosers remain closed so that service will continue to the feeders through the non-faulted portions of the system.

It can be seen, therefore, that by utilizing reclosers having fault current direction sensing means and means for modifying the recloser's tripping time in accordance with the direction of fault current, conventional reclosers can be modified for use in a loop circuit.

While only a few embodiments of the invention have been shown and described, other modifications will occur to those skilled in the art once applicant's inventive concept is known.

In addition, while the invention is illustrated with respect to a single phase recloser it will be understood that it has application to three phase reclosers as well.

Accordingly, it is intended to cover in the appended claims all such modifications and variations that fall within the true spirit of the invention.

I claim:

1. A repeating circuit interrupter for protecting an electrical system having switch means and over-current responsive means in circuit with said system and operative to open the same upon the occurrence of an over-current, time delay means connected to said switch means for delaying the opening thereof, reclosing means connected to said switch means for reclosing the same after an opening operation, directional current responsive means in circuit with said system and connected to said time delay means and operable upon the occurrence of an over-current in a first direction to modify the operation of said time delay means so that the opening time of switch means is altered, said directional current responsive means being ineffective to modify said time delay means when an over-current flows in the opposite direction.

2. A repeating circuit interrupter having switch means, over-current responsive means in circuit with said switch means and operative to open the same upon the occurrence of an over-current, reclosing means connected to said switch means for reclosing the same after an opening operation, hydraulic time delay means connected to said switch means for delaying the opening thereof and having fluid discharge means, and directional current responsive means in circuit with said switch means and operable upon the occurrence of an over-current in a first direction through said switch means to modify the area of said fluid discharge means so that the time delay of said circuit interrupter will be altered, said directional current responsive means being ineffective to alter said time delay upon the occurrence of an over-current in an opposite direction.

3. A liquid immersed circuit interrupter including switch means, a time delay cylinder, a magnetic plunger movable in said cylinder upon the occurrence of a fault current to displace fluid therefrom and to open said switch means, said cylinder having relief duct means for discharging liquid displaced by said plunger, and directional current responsive means operable upon the occurrence of a fault current in a first direction through said switch means to modify the area of said relief duct means so that the time delay of said circuit interrupter will be altered, said directional current responsive means being ineffective to alter said time delay upon the occurrence of a fault current in an opposite direction.

4. A repeating liquid immersed circuit interrupter including switch means, an overload solenoid having a coil in series with said switch means and a magnetic plunger mechanically coupled to said switch means, a time delay cylinder, said magnetic plunger being movable in said cylinder upon the occurrence of a fault current to open said switch means and to displace liquid from said cylinder, relief duct means for said cylinder for discharging the liquid displaced therefrom, valve means associated with said relief duct means, and directional current responsive means operable upon the occurrence of a fault current in a first direction through said switch means to move said valve means into a flow restricting position relative to said relief duct means so that the time delay of said circuit interrupter will be altered, said directional current responsive means being ineffective to alter said time delay upon the occurrence of a fault current in an opposite direction.

5. A repeating circuit interrupter for protecting an electrical system and having switch means, control means for said switch means including abnormal condition responsive means in circuit with said system and operative to initiate a switch opening operation upon the occurrence of an abnormal circuit condition, said switch control means including time delay means for delaying the opening of said switch means, reclosing means connected to said switch means for reclosing the same after an opening operation, directional power responsive means in circuit with said system and connected to said time delay means and operative upon the occurrence of abnormal power flow in a first direction resulting from an abnormal circuit condition to modify the operation of said time delay means so that the opening time of said switch means is altered, said directional power responsive means being ineffective to modify said time delay means when an abnormal condition causes abnormal power flow in the opposite direction.

6. A circuit interrupter for protecting an electrical system and having switch means, switch control means including abnormal condition responsive means in circuit with said system and operative to open said switch means upon the occurrence of an abnormal circuit condition, said control means including time delay means for delaying the opening of said switch means, directional power responsive means in circuit with said system and connected to said time delay means and operative upon the occurrence of an abnormal circuit condition causing abnormal power flow in a first direction to modify the operation of said time delay means so that the opening time of said switch means is altered, said directional power responsive means being ineffective to modify said time delay means when an abnormal circuit condition causes power flow in the opposite direction.

References Cited in the file of this patent

UNITED STATES PATENTS

| | | |
|---|---|---|
| 688,359 | Stillwell | Dec. 10, 1901 |
| 863,791 | Emery | Aug. 20, 1907 |
| 869,359 | Fuss | Oct. 29, 1907 |
| 1,669,149 | Traver | May 8, 1928 |
| 1,994,921 | Rose | Mar. 19, 1935 |
| 2,336,836 | Bany | Dec. 14, 1943 |
| 2,337,837 | Reagan | Dec. 28, 1943 |
| 2,528,194 | Van Ryan | Oct. 31, 1950 |
| 2,545,368 | McDonald | Mar. 13, 1951 |
| 2,700,081 | Wallace | Jan. 18, 1955 |
| 2,734,961 | Harry | Feb. 14, 1956 |
| 2,752,536 | Bonine | June 26, 1956 |